United States Patent Office 3,418,373
Patented Dec. 24, 1968

3,418,373
PREPARATION OF AROMATIC
DIAMINE MIXTURES
Charles G. Summers, Scott Depot, and Robert L. Wright, Nitro, W. Va., assignors to Monsanto Company, St. Louis, Mo., a corporation of Delaware
No Drawing. Filed Apr. 12, 1965, Ser. No. 447,543
7 Claims. (Cl. 260—576)

ABSTRACT OF THE DISCLOSURE

When the reaction of p-alkyl aminophenol with an aromatic primary amine is conducted in the presence of a catalytic amount of free iodine and powdered iron or in the presence of iron chloride, a mixture of N-alkyl-N'-aryl-p-phenylenediamine, N,N' - dialkyl - p - phenylenediamine, and N,N'-diaryl-p-phenylenediamine is formed. The process provides an economical route to a valuable mixture of antioxidants for oxidizable substances, especially natural and synthetic rubber.

This invention relates to the preparation of mixtures of aromatic diamines containing N-alkyl-N'-aryl-arylenediamines in admixture with other aromatic diamines.

It has been suggested that N-sec-alkyl-N'-phenyl-p-phenylenediamines may be prepared by heating aniline with the corresponding N-sec-alkyl-p-aminophenol, but the reaction is unsatisfactory for industrial use because of low yields. A variety of possible condensation catalysts and mixtures thereof have been investigated, but satisfactory yields were not obtained. Such condensation catalysts are, for example, hydrogen iodide, zinc iodide, copper, zinc oxide, powdered iron, aluminum chloride, iron chloride, calcium chloride, ammonium chloride, titanium dioxide, hydrochloric acid, acid clays, iodine, triethyl phosphate, and mixtures thereof.

The low yields of N-sec-alkyl-N'-phenyl-p-phenylenediamine from N-alkyl aminophenols contrast sharply with those of diphenyl-p-phenylenediamine from unsubstituted p-aminophenol. Condensation of p-aminophenol and aniline in the presence of condensation catalyst gives essentially quantitative yields of N,N'-diphenyl-p-phenylenediamine. Hydroquinone also reacts with aniline in the presence of condensation catalysts like triethyl phosphate or a mixture of powdered iron and iodine to form diphenyl-p-phenylenediamine in high yield. On the other hand, N-alkyl-p-aminophenol did not react with aniline in the presence of triethyl phosphate. A reasonable reaction rate was observed in the presence of powdered iron and iodine catalyst mixture, but the yield of N-alkyl-N'-phenyl-p-phenylenediamine was still unacceptable. However, it has now been discovered that when the reaction of p-alkyl aminophenol with the aromatic primary amine is conducted in the presence of a catalytic amount of free iodine and powdered iron, the iodine being within the range of ¾ to 6 parts by weight of iron, or in the precence of iron chloride there is formed a mixture of N-alkyl-N'-aryl-p-phenylenediamine, N,N' - dialkyl - p-phenylenediamine, and N,N'-diaryl-p-phenylenediamine. All of these components are valuable antioxidants for oxidizable substances, especially natural and synthetic rubbers. The process, therefore, provides an economical route to a valuable mixture of products.

Aromatic primary amines useful in the process include aniline, o-toluidine, p-toluidine, m-toluidine, p-tert-butyl-aniline, p-amyl-aniline, p-hexyl-aniline, p-octyl-aniline, p-decyl-aniline, p-dodecyl-aniline, alpha-naphthyl-amine, beta-napthyl-amine, and xenyl amine. The aminophenols useful in the process may be represented by the formula

where R is saturated aliphatic of 1 to 20 carbon atoms, preferably secondary alkyl of 3 to 12 carbon atoms. Thus examples of R comprise methyl, ethyl, propyl, isopropyl, sec-butyl, tert-butyl, sec-amyl, sec-hexyl, sec-octyl, n-octyl, sec-decyl, sec-dodecyl, cyclopentyl, or cyclohexyl. The reactions are usually conducted within the range of 175°–250° C., preferably 200° to 240° C., the optimum for most reactions falling within the range of 210°–230° C. One molecular proportion of primary aromatic amine is required per mole of N-alkyl-aminophenol, but a slight excess is usually desirable and up to two moles may be used; but large excess has an adverse effect, especially at temperatures above 250° C. The reactions are advantageously carried out in the presence of an azeotropic agent like xylene, but this is not necessary. The following examples will illustrate the invention in greater detail, but are not to be taken as limitative. The reactions described were carried out in a glass reactor fitted with a Dean-Stark trap for collection of water. The trap was filled to slight overflowing with xylene before starting the reaction in order to provide a little xylene vapor to carry off by-product water. Displacement of xylene by water provided sufficient azeotroping effect. Heating was continued until nearly the theoretical amount of water had been collected and evolution of water had substantially ceased.

Example 1

Into a suitable reactor was charged 96.6 grams of N-(1,3-dimethylbutyl)-p-aminophenol, 51.2 grams of aniline, 3.0 grams of powdered iron, and 3 grams of iodine. The mixture was heated at 210° to 230° C. for 8 hours, during which time 8.1 ml. of by-product water was collected. The volatile constituents were then removed by heating in vacuo to 180° C./1 mm. Hg pressure. The reaction product obtained as the residue weighed 125 grams and contained 13.4% of N,N'-di(1,3-dimethylbutyl)-p-phenylenediamine, 50.2% of N-phenyl-N'-(1,3-dimethylbutyl)-p-phenylenediamine, and 17.5% of N,N'-diphenyl-p-phenylenediamine. In similar manner, a series of reactions were carried out in which the proportions of iron and iodine varied. The relationship between the catalyst ratio, reaction time, and the total quantity of the phenylenediamines formed is shown in the table below:

TABLE I

| Fe, g. | I₂, g. | Reaction time, hours | Phenylenediamines, percent of reaction product |
|---|---|---|---|
| 4 | 3 | 16.5 | 76.6 |
| 3 | 3 | 8.5 | 81.1 |
| 2 | 3 | 8.0 | 72.1 |
| 2 | 3 | 8.5 | 79.2 |
| 1 | 3 | 13.0 | 63.1 |
| 2 | 6 | 7.0 | 64.5 |
| 0.5 | 3 | 6.75 | 49.7 |
| 1.0 | 6 | 6.0 | 64.5 |
| 0.5 | 6 | 12.0 | 49.0 |

Example 2

Into a suitable reactor was charged 96.6 grams of N-(1,3-dimethylbutyl)-p-aminophenol, 60 grams of a mixture of 24% p-toluidine and 36% o-toluidine, 2 grams of powdered iron, and 3 grams of iodine. The mixture was heated at 215° to 224° C. for 9½ hours, during which time 8.3 ml. of water was collected. The reaction mixture was then heated in vacuo to 180° C./1 mm. Hg pressure to obtain 131.5 grams of reaction product. Assay of the aforesaid product residue gave 13.6% of N,N'-di(1,3-dimethylbutyl)-p-phenylenediamine, 46.7% of N-tolyl-N'- dimethylbutyl-p-phenylenediamine, and 19.1% of N,N'-ditolyl-p-phenylenediamine.

Example 3

Into a suitable reactor was charged 96.6 grams of N-(1,3-dimethylbutyl)-p-aminophenol, 60 grams of o-toluidine, 2 grams of powdered iron, and 3 grams of iodine. The reaction mixture was then heated at 220° to 230° C. for about 5 hours or until 8.2 ml. of water had been collected. The mixture was then heated in vacuo at 180° C./1 mm. Hg pressure to obtain 127 grams of reaction product which contained 13.5% of N,N'-di(1,3-dimethylbutyl)-p-phenylenediamine, 44.4% of N-o-tolyl-N'-dimethylbutyl-p-phenylenediamine, and 17.4% of N,N'-di-o-tolyl-p-phenylenediamine.

Example 4 p-Toluidine was substituted for the o-toluidine of Example 3 and the reaction mixture heated at 223° to 237° C. for about 8 hours, or until approximately the theoretical amount of water had been collected. The reaction mixture was then heated in vacuo at 180° C./1 mm. Hg pressure to obtain 131 grams of reaction product which contained 8.1% of N,N'-di(1,3-dimethylbutyl)-p-phenylenediamine, 32.8% of N-p-tolyl-N'-(1,3-dimethylbutyl)-p-phenylenediamine, and 20.7% of N,N'-di(p-tolyl)-p-phenylenediamine.

A series of reactions were carried out employing a mixture of toluidines and varying the iron-iodine catalyst ratio. The mixture approximated that obtained from nitration of toluene and contained approximately 4.0% meta, 37% para, and 59% orthotoluidine. The relationship to reaction time and the percentage of the phenylenediamines contained in the reaction product are shown in the table below:

TABLE II

| Fe, g. | I₂, g. | Reaction time, hours | Phenylenediamines, percent of reaction product |
| --- | --- | --- | --- |
| 4 | 3 | 11.5 | 71.6 |
| 2 | 2 | 12.0 | 69.3 |
| 3 | 3 | 11.0 | 76.3 |
| 4 | 4 | 10.0 | 66.5 |
| 5 | 5 | 7.0 | 67.6 |
| 6 | 6 | 6.5 | 71.0 |
| 2 | 3 | 9.5 | 79.4 |
| 2 | 4.5 | 5.0 | 78.0 |
| 1 | 6.0 | 5.5 | 69.6 |

Example 5

Into a suitable reactor was charged 98.6 grams of N(1,3-dimethylbutyl)-p-aminophenol, 60 grams of aniline, and 6 grams of FeCl₂, 4H₂O. The mixture was heated at 200°–235° C. for about 8 hours or until nearly the theoretical amount of water had been collected. A total of 11.3 ml. of water was collected. The volatile constituents were removed by heating in vacuo to 180° C./2 mm. Hg pressure. The product (131 grams) contained 10.2% of N,N'-di(1,3-dimethylbutyl)-p-phenylenediamine, 40.5% of N-phenyl-N-(1,3-dimethylbutyl)-p-phenylenediamine, and 20.1% of N,N'-diphenyl-p-phenylenediamine. Comparable results were obtained using 6 grams of FeCl₃, 6H₂O as catalyst or a mixture of 6 grams of FeCl₃, 4H₂O and 4 grams of FeCl₃, 6H₂O.

Example 6

Into a suitable reactor was charged 75.6 grams of N-isopropyl-p-aminophenol, 59 grams of the mixture of toluidines described in connection with Table II, 1 gram of powdered iron, and 6 grams of iodine. The mixture was heated at about 215° C. for approximately 6 hours, during which time 9.5 ml. of by-product water was collected. The volatile constituents were then removed by heating in vacuo to 180° C./1.5 mm. Hg pressure. The reaction product obtained as the residue weighed 109 grams and contained 3.1% of N,N'-di(isopropyl)-p-phenylenediamine, 32.1% of N-isopropyl-N'-tolyl-p-phenylenediamine, and 25.8% of N,N'-ditolyl-p-phenylenediamine.

Example 7

The charge of Example 6 was repeated, substituting 75.6 grams of N-isopropyl-p-aminophenol by 95.6 grams of N-cyclohexyl-p-aminophenol, and heating at refluxing temperature. After about 3 hours, 10 grams of additional toluidine mixture was added and heating continued. The total heating time was about 6 hours at 220°–234° C., during which time 9.0 ml. of water was collected. The volatile constituents were removed by heating in vacuo to 190° C./2 mm. Hg pressure. There was obtained 190 grams of reaction product containing 7.5% of N,N'-dicyclohexyl-p-phenylenediamine, 37.0% of N-cyclohexyl-N'-tolyl-p-phenylenediamine, and 14.4% of N,N'-ditolyl-p-phenylenediamine.

Example 8

The charge of Example 6 was repeated substituting 75.6 grams of N-isopropyl-p-aminophenol by 110 grams of N-sec-octyl-p-aminophenol. The mixture was heated about 14 hours at 215° C., during which time 9 ml. of water was collected. After removing volatile constituents by heating in vacuo to 190° C./3 mm. Hg pressure, there was obtained 138.5 grams of product which contained 5.1% of N,N'-di(sec-octyl)-p-phenylenediamine, 28.5% of N-sec-octyl-N'-tolyl-p-phenylenediamine, and 12.2% of N,N'-ditolyl-p-phenylenediamine.

It is intended to cover all changes and modifications of the examples of the invention herein chosen for purposes of disclosure which do not constitute departures from the spirit and scope of the invention.

What is claimed is:

1. A mixture of arylenediamines prepared by reacting (1) primary aromatic amine and (2)

where R is saturated aliphatic of 1 to 20 carbon atoms, at a temperature of 175°–250° C. in the presence of a catalytic amount of catalyst selected from the group consisting of
(1) a mixture of free iodine and powdered iron, the iodine being within the range of ¾ to 6 parts by weight per part of iron, and
(2) iron chloride
said mixture containing N,N'-dialiphatic-p-phenylenediamine, N,N'-diaryl-p-phenylenediamine, and N-aliphatic-N'-aryl-p-phenylenediamine.

2. A mixture of arylenediamines prepared by reacting (1) aniline and (2)

where R is secondary alkyl of 3 to 12 carbon atoms at a temperature of 175°–250° C. in the presence of a catalytic amount of catalyst selected from the group consisting of
(1) a mixture of free iodine and powdered iron, the iodine being within the range of ¾ to 6 parts by weight per part of iron, and
(2) iron chloride
said mixture containing N,N'-dialkyl-p-phenylenediamine, N,N'-diphenyl-p-phenylenediamine, and N-alkyl-N'-phenyl-p-phenylenediamine.

3. A mixture of arylenediamines prepared by reacting (1) toluidine and (2)

where R is secondary alkyl of 3 to 12 carbon atoms at a temperature of 175°–250° C. in the presence of a catalytic amount of catalyst selected from the group consisting of (1) a mixture of free iodine and powdered iron, the iodine being within the range of ¾ to 6 parts by weight per part of iron, and
(2) iron chloride said mixture containing N,N'-dialkyl-p-phenylenediamine, N,N'-ditolyl-p-phenylenediamine, and N-alkyl-N'-tolyl-p-phenylenediamine.

4. N-alkyl-N'-aryl-arylenediamines in admixture with N,N'-dialkyl-arylenediamines and N,N'-diaryl-arylenediamines prepared by
reacting equal molecular proportions of aniline and N-(1,3-dimethylbutyl)-p-aminophenol at a temperature of 210°–230° C. in the presence of a catalytic amount of a mixture of equal parts by weight of powdered iron and free iodine.

5. N-alkyl-N'-aryl-arylenediamines in admixture with N,N'-dialkyl-arylenediamines and N,N'-diaryl arylenediamines prepared by
reacting equal molecular proportions of toluidine and N-(1,3-dimethylbutyl)-p-aminophenol at a temperature of 210°–230° C. in the presence of a catalytic amount of a mixture of free iodine and powdered iron, the iodine being within the range of ¾ to 6 parts by weight per part of iron.

6. A mixture of arylenediamines prepared by
reacting aniline and N-cyclohexyl-p-aminophenol at a temperature of 200°–240° C. in the presence of a catalytic amount of a mixture of free iodine and powdered iron, the iodine being within the range of ¾ to 6 parts of weight per part of iron said mixture containing N,N'-dicyclohexyl-p-phenylenediamine, N,N'-diphenyl-p-phenylenediamine, and N-cyclohexyl-N'-phenyl-p-phennylenediamine.

7. N-alkyl-N'-aryl-arylenediamines in admixture with N,N'-dialkyl-arylenediamines and N,N'-diaryl-arylenediamines prepared by
reacting equal molecular proportions of aniline and N-(1,3-dimethylbutyl)-p-aminophenol at a temperature of 175°–250° C. in the presence of a catalytic amount of iron chloride.

References Cited
UNITED STATES PATENTS

| | | | |
|---|---|---|---|
| 2,734,808 | 2/1956 | Biswell | 260—576 X |
| 3,081,349 | 3/1963 | Spacht | 260—576 |
| 3,205,265 | 9/1965 | Danziger et al. | 260—576 |

CHARLES B. PARKER, *Primary Examiner.*

P. C. IVES, *Assistant Examiner.*

U.S. Cl. X.R.
260—577